United States Patent [19]
Nakao et al.

[11] Patent Number: 4,500,133
[45] Date of Patent: Feb. 19, 1985

[54] BABY CHAIR

[75] Inventors: Shinroku Nakao, Kanagawa; Yoshiyasu Ishii; Hiroaki Matsuda, both of Tokyo, all of Japan

[73] Assignee: Combi Co., Ltd., Tokyo, Japan

[21] Appl. No.: 414,091

[22] Filed: Sep. 2, 1982

[51] Int. Cl.³ .............................................. B60R 21/10
[52] U.S. Cl. .................... 297/131; 297/216; 297/250; 297/377; 297/464
[58] Field of Search ............... 297/130, 131, 250, 253, 297/254, 255, 256, 377, 216, 464

[56] References Cited

U.S. PATENT DOCUMENTS

| | | | |
|---|---|---|---|
| 3,492,047 | 1/1970 | Dudouyt | 297/377 |
| 3,922,035 | 11/1975 | Wener | 297/250 |
| 4,033,622 | 7/1977 | Boudreau | 297/250 |
| 4,186,962 | 2/1980 | Meeker | 297/250 |
| 4,371,206 | 2/1983 | Johnson, Jr. | 297/377 X |

FOREIGN PATENT DOCUMENTS

| | | | |
|---|---|---|---|
| 594242 | 6/1925 | France | 297/131 |
| 969686 | 9/1964 | United Kingdom | 297/250 |

*Primary Examiner*—James T. McCall
*Attorney, Agent, or Firm*—Sughrue, Mion, Zinn, Macpeak & Seas

[57] ABSTRACT

A baby chair comprises a chair body including a seat portion and a back rest portion, a U-shaped main support leg for supporting the chair body, and a support member for supporting the U-shaped support leg when the chair is used indoor, and holder members for holding the U-shaped main support leg at an upright position when the chair is used as a car seat rack. The baby chair further includes a belt member for holding a baby or child in a safety condition when a collision shock or inertia force is applied to the chair.

13 Claims, 22 Drawing Figures

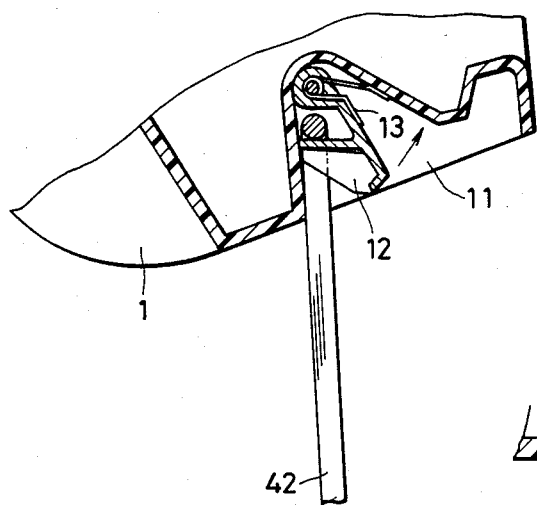
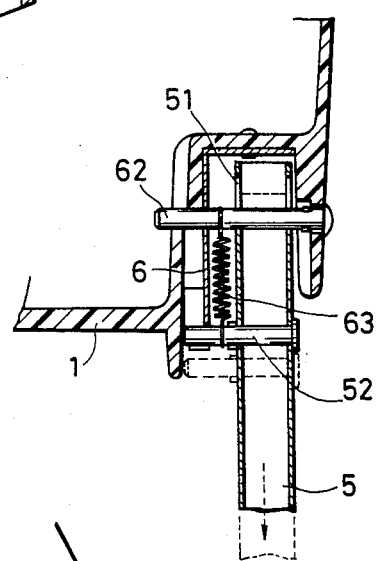
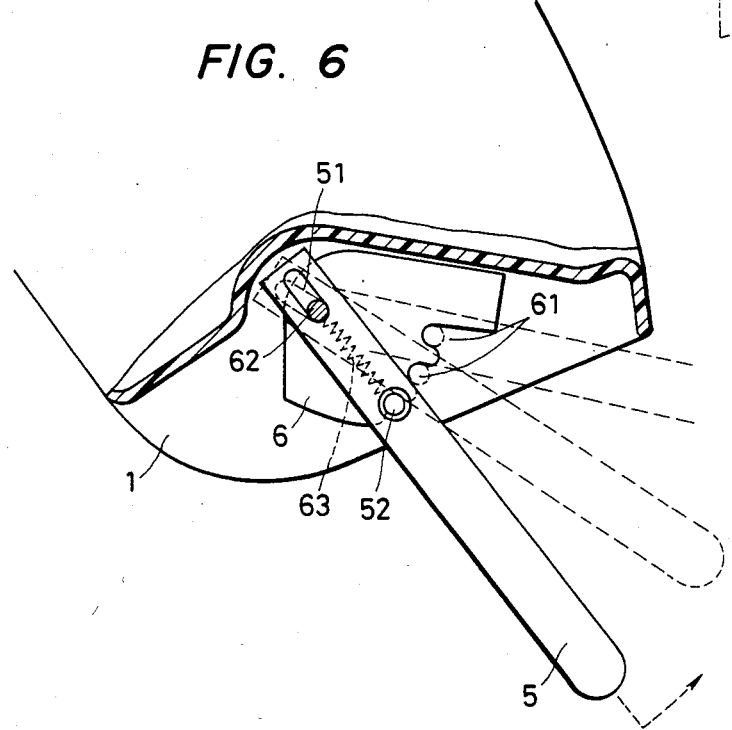

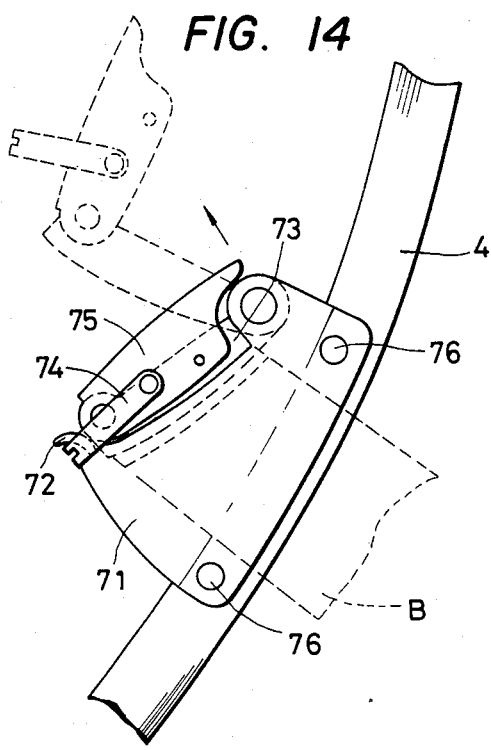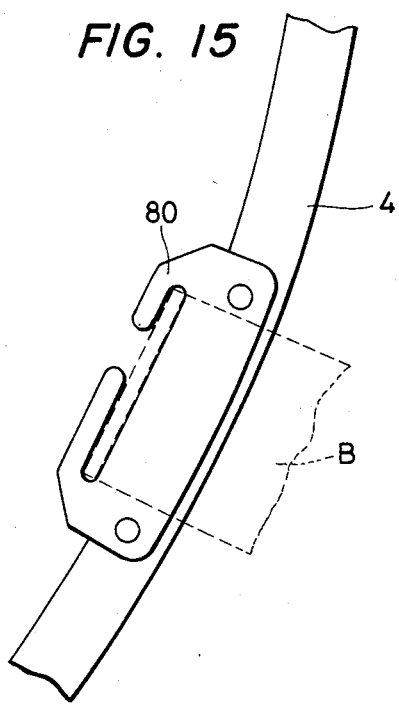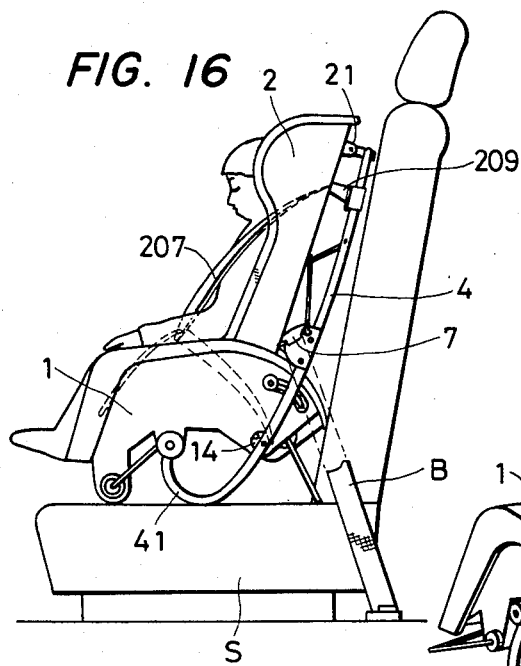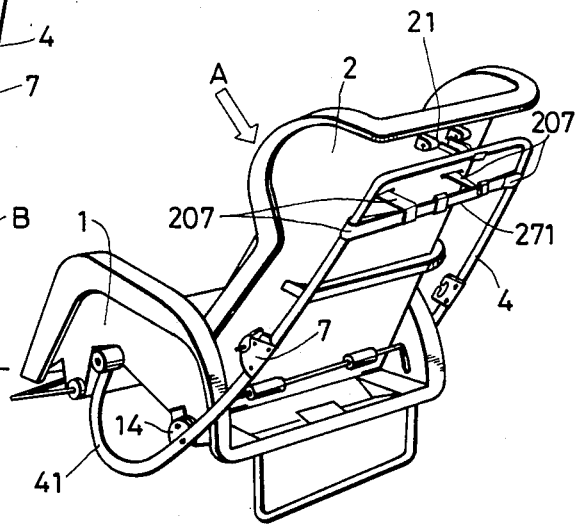

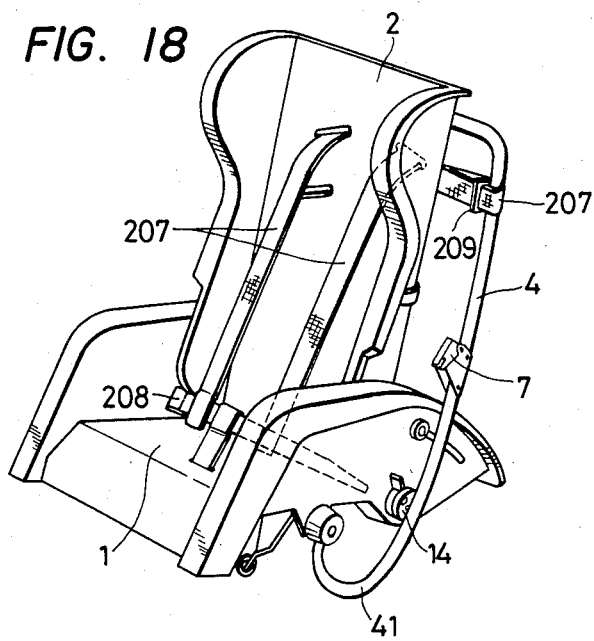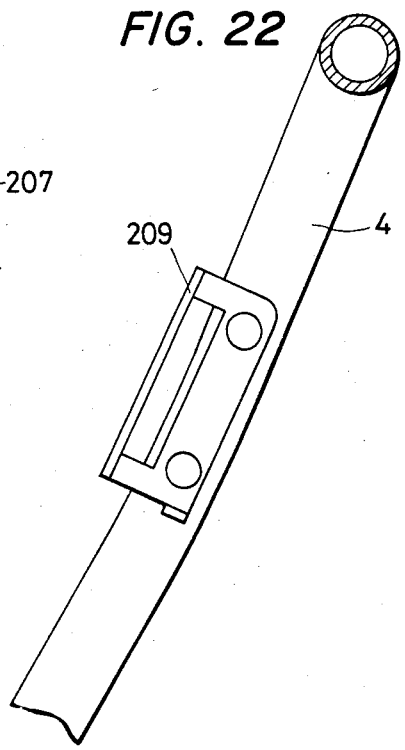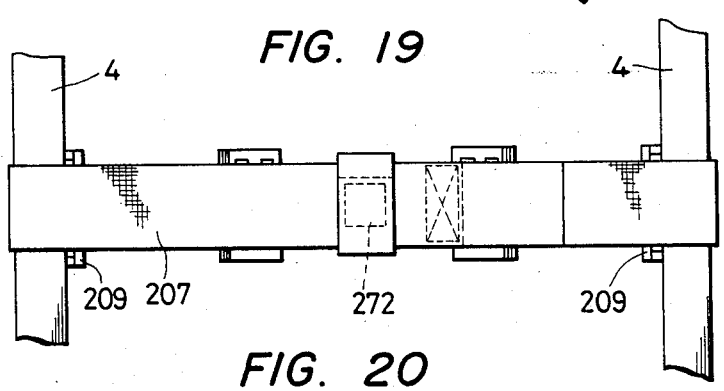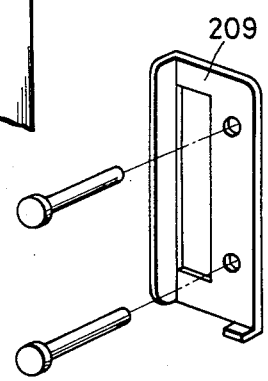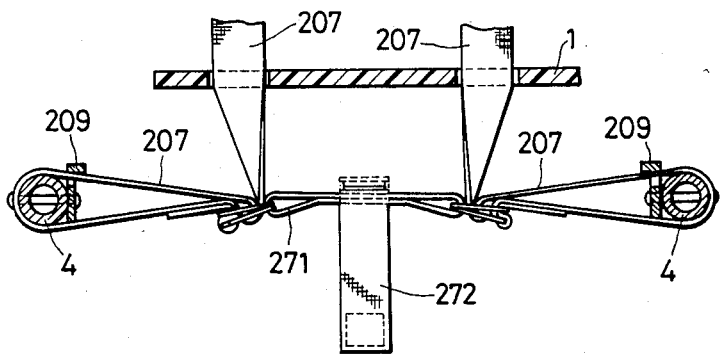

BABY CHAIR

BACKGROUND OF THE INVENTION

The present invention relates to a baby or child chair. More particularly it relates to a chair which can be used in a car being placed on a car seat as well as used indoors.

Baby chairs to be placed on car seats or to be suspended from the back rest of the seats have been proposed. However, with baby chairs heretofore proposed, it is difficult to protect sufficiently the baby sitting on a chair in case of emergency stop or collision of car, because they are merely placed on the seat or suspended from the seat without fixing the chair to the seat or with them insufficiently fixed. To improve these shortcomings, we have developed a baby chair capable of being placed in a car as shown in Japanese Utility Model publication No. 56-13820. However, it has such a construction that both ends of the belts for securing a baby or child are fitted to the chair body, so that the inertia force applied to the belt in case of collision concentrates directly on the chair, particularly on the back portion of the chair, which might cause break-down of the portion.

SUMMARY OF THE INVENTION

Accordingly, an object of this invention is to provide a baby chair which can be used optionally as a stationary chair, a chair capable of rocking, or as a car seat to be placed on an automotive seat, the position changing means being very simple.

Another object of this invention is to provide a baby chair a main leg member of which can serve as a holding bar for a seat belt when used in a car, while it serves as a support leg or a rocking support leg when used indoors.

Another object of this invention is to provide a baby chair which can prevent the chair not only from falling in the running direction of the car, but also from laterally shifting, twisting, or moving by positively gripping the seat belt engaged with the leg bar.

Still another object of this invention is to provide a baby chair which can mitigate the impact applied on the chair and the baby sitting on the chair in case of collision.

BRIEF DESCRIPTION OF THE DRAWINGS

In the accompanying drawings:
FIG. 5 is an enlarged section view of the engaging portion of a support bar;
FIG. 6 is an enlarged side view showing a rear leg;
FIG. 7 is an enlarged sectional view for FIG. 6;
FIG. 14 is a side view of the clamping device when clamping a seat belt;
FIG. 15 is a side view of a seat belt insertion metal;
FIG. 16 is a side view of the baby chair showing the condition when placed on a car seat in use of a seat belt of the baby chair;
FIG. 17 is a perspective view of the baby chair in FIG. 16 as viewed from the rear;
FIG. 18 is a perspective view of the same as viewed from the front;
FIG. 19 is a front view showing the engagement between the seat belt and the main leg bar;
FIG. 20 is a plan of the same;
and
FIGS. 21 and 22 are perspective views of the insertion guide for the seat belt, respectively.

DETAILED DESCRIPTION OF THE INVENTION

Figure 1:
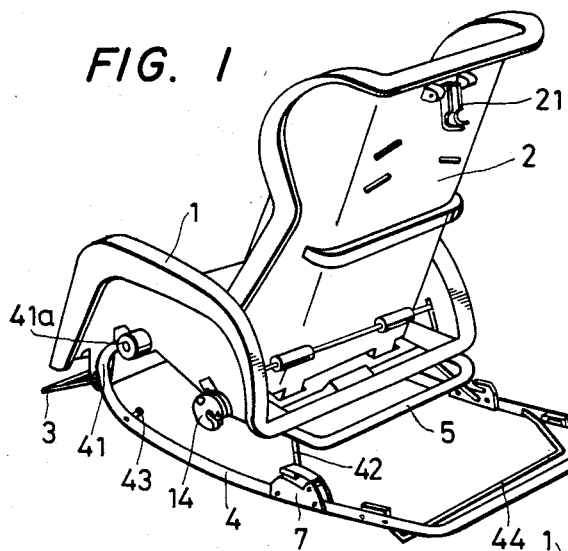
FIG. 1 is a perspective view of a body chair according to the present invention used as a stationary chair.

The preferred embodiment of the present invention will hereinafter be described with reference to the accompanying drawings. Referring now to FIGS. 1 to 10, a seat portion 1 of a baby chair is provided at the rear end with a back rest portion 2 which is pivotally fitted to the seat portion 1 in such a way that the inclination can be adjusted. The seat portion 1 and the back rest portion are preferably made of synthetic resin such as polypropylene. A front leg 3 is fitted to the underside of the seat portion 1 near the front end and is adapted to be collapsible as shown by the arrow a in FIG. 2. An integrally formed U-shape main leg bar or leg member 4 is provided on both sides with rising portions 41 which are pivotally fitted to the underside of the seat portion 1, the width of the U-shaped body of the main leg bar 4 being somewhat wider than that of the seat portion 1. A support bar 42 is pivotally provided at the middle of the main leg bar 4. An upper portion of the support bar is inserted into a holding groove 11 formed at the rear end of the underside of the seat portion 1 so as to be secured through a holding plate 12 as shown in FIG. 5. Preferably, the holding plate 12 is normally pressed by a spring 13, so that the support bar 42 can be inserted freely into the holding groove 11 against the force of the spring 13. Further, the support bar 42 is adapted to be rotatable in the direction as shown by the arrow b in FIG. 2 or in the opposite direction.

Figure 8:
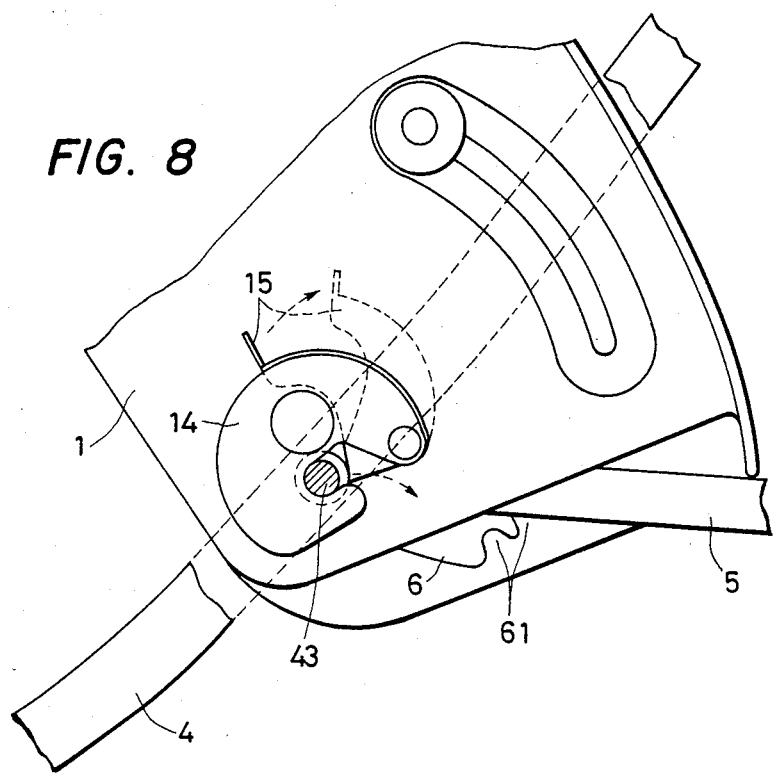
FIG. 8 is an enlarged side view illustrating a holder for main leg bar.
Figure 9:
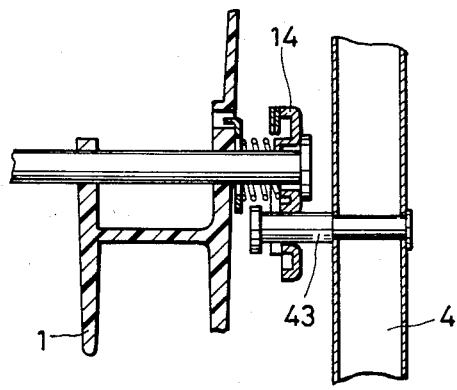
FIG. 9 is an enlarged sectional view for FIG. 8.
Figure 10:
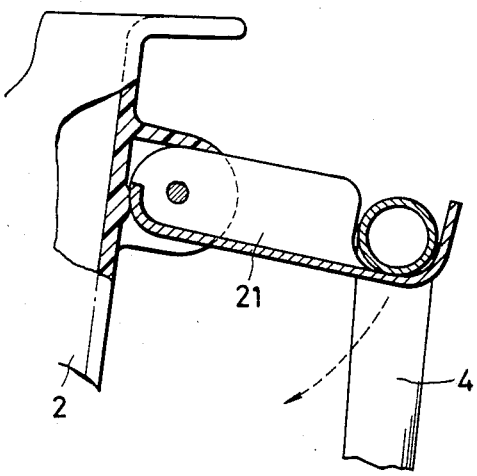
FIG. 10 is an enlarged sectional view showing a hook and main leg bar when they are engaged.
Figure 11:
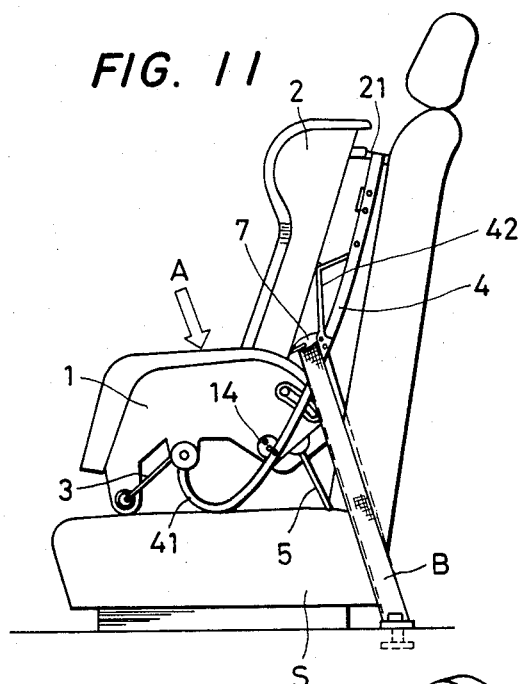
FIG. 11 is a side view of the baby chair showing the condition when placed on a car seat.
Figure 12:
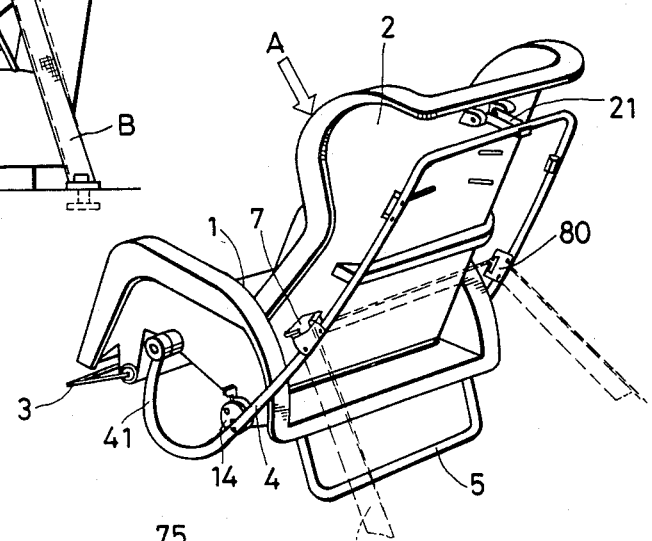
FIG. 12 is a perspective view of the baby chair in FIG. 11.
Figure 13:
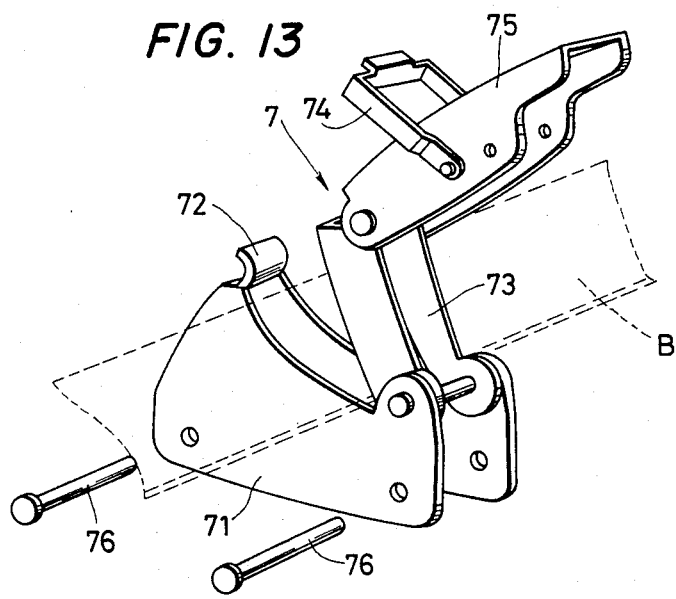
FIG. 13 is a perspective view of a seat belt clamping device.

Holders 14 are mounted at a lower position on both sides of the seat portion 1 near the rear end thereof in order to maintain the main leg bar 4 at an upright position with engaging with holding pins 43 projecting from the inside of the main leg bar 4 at the middle portion. It is desired that the holders 14 be each provided with a locking lever mechanism 15 as shown in FIGS. 8 and 9. As shown in FIG. 10, a hook 21 mounted near the top end of the back portion 2 of the chair secures the rear end portion of the main leg bar 4. As shown in FIG. 6, a rear auxiliary leg 5 provided at the rear end of the underside of the seat portion 1 engages with the holding grooves 61 of a holding plate 6 detachably fixed to the seat portion 1. A pivot pin 62 for the rear auxiliary leg 5 is inserted into a sliding slot 51 formed near the base end of the rear auxiliary leg 5. A return spring 63 for the rear auxiliary leg 5 is secured to the pivot pin 62 at one end, and secured, at the other end, to a holding pin 52 extending from the rear auxiliary leg 5 to secure the rear branch leg elastically. Seat belt clamping mechanism 7 fitted to the top surface of the main leg bar 4 at the middle portion is used for clamping automotive seat belts.

The functions and uses of a baby chair according to this invention having the aforementioned construction are hereinafter described.

When using as an ordinary rack type chair:

In this case, the chair is used in the manner as shown in FIG. 1: after securing the support bar 42 of the main leg bar 4 into the holding groove 11 provided on the underside of the seat portion 1 to unite the seat portion 1 and the main leg bar 4, the front leg 3 fitted to the underside of the seat portion 1 near the front end is raised up so that the undersides of the front leg 3 and the main leg bar 4 come in contact with the floor to achieve a stable installation. The angle between the seat portion 1 and the back rest portion 2 may be adjusted in the well known manner in the art (reclining). Further, a rear leg 44 may be fitted to the rear portion of the main leg bar 4 so that the contact with floor is achieved by the front leg 3 and rear leg 44 as shown in FIG. 1.

Figure 2:
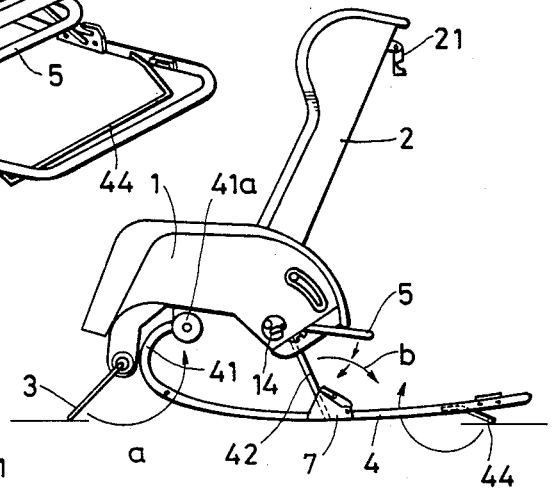
FIG. 2 is a side view of the chair in FIG. 1.
Figure 3:
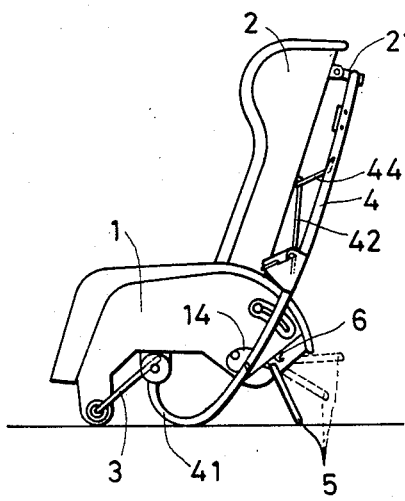
FIG. 3 is a side view of a baby according to this invention used as a car seat.
Figure 4:
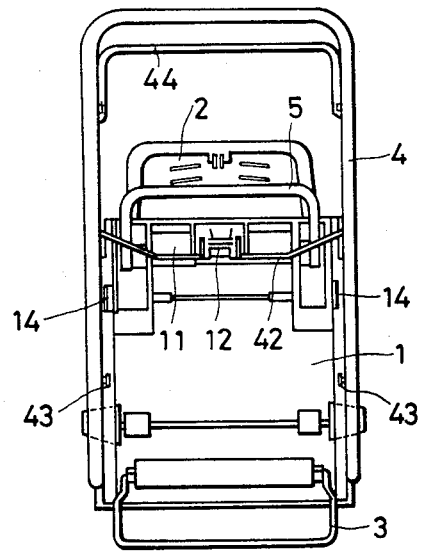
FIG. 4 is a bottom view of the chair in FIG. 1.

When using as a rocking chair:

In the aforementioned arrangement for the ordinary use, the contact with floor may be released by turning the front leg 3 fitted to the underside of the seat portion 1 near the front end in the direction shown by the arrow a in FIG. 2 and turning the rear leg 44 in the direction shown by the arrow in FIG. 2. As a result, the main leg bar 4 only comes in contact with the floor, so that a rocking motion may be achieved along the curve of the main leg bar 4. Further, in this case, the angle between the seat portion 1 and the back rest portion 2 (reclining angle) may be adjusted in the same manner as mentioned above.

When using as a car seat:

In this case, after releasing the engagement between the seat portion 1 and the support bar 42 fitted to the main leg bar 4, the rear end of the main leg bar 4 is turned upwardly. As a result, the main leg bar 4 turns about pivot shafts 41a, so that the holding pins 43 provided at the middle portion of the main leg bar 4 engage with the holders 14, mounted on both sides of the seat portion 1 to maintain the main leg bar 4 at the upright position (See FIG. 3). Then, the rear auxiliary leg 5 provided at the rear end of the underside of the seat portion 1 is pulled out so as to come in contact with the floor forming a desired angle, and the front leg 3 is collapsed inwardly. Thus, the seat portion 1 can be placed on a car seat to use it as a car seat. In this case, the back rest portion 2 can also be fixed to the main leg bar 4 by engaging the rear end of the main leg bar 4 with the hook 21, resulting in a whole construction having a high rigidity. It is not necessary to use both the hook 21 and holders 14 at the same time. Using either of them permits the objective of the present invention to be achieved.

Accordingly, a baby chair having the aforementioned construction according to this invention has three uses; a stationary chair placed on a floor, a rocking chair, and a car safety seat.

The seat belt clamping mechanism 7 will be described in detail with reference to FIGS. 11 to 15. The clamping mechanism 7 for the seat belt B is fixed to the top surface of the middle portion of the main leg bar 3. The clamping mechanism 7 comprises a base frame 71 having a finger 72 at the top, an intermediate clamp lever 73 one end of which is fitted pivotally to the end of the base frame 71, and a main clamp lever 75 having a U-shaped member 74 to be engaged with the finger 72. The clamp lever 75 is fitted pivotally to the other end of the intermediate clamp lever 73. The base frame 71 is secured to the main leg bar 4 by pins 76. A seat belt insertion metal 80 is secured to the main leg bar 4 at the position opposite to the clamping mechanism 7 for passing the seat belt B through it.

The clamping mechanism 7 according to the invention permits the chair body A to unite with the seat S to hold a stable condition by passing the seat belt B through the clamping mechanism 7 to clamp a part of the belt B securely. Even if the seat belt B is somewhat loosened, the chair body A which has united with the belt through the clamping mechanism 7 would be prevented from moving laterally on the seat. In addition, since the chair body A according to the invention is not fixed directly to a car seat S, but fixed through a main leg bar 4, external forces exerted on the seat belt B in collision, etc. will be transmitted to the chair body through the main leg bar 4, which can prevent the external forces from concentrating in a particular position, especially in the chair body A.

A baby holding mechanism of the invention will hereinafter be described with reference to FIGS. 16 to 22. Two securing belts 207 for holding a baby are secured to a waist belt 208 at their lower ends, and their upper ends are, after passing through the back rest portion 2, wound around the main leg bar 4 so as to be united together. Insertion guides 209 for the securing belts 207 are fitted to the main leg bar 4. The securing belts 207 are connected to the main leg bar 4 as shown in FIGS. 18 and 19 by securing their ends passed through the back rest portion 2 and, preferably, by connecting part of them with tension belt 271. A tying band 272 is provided to gather the securing belts not in use.

The chair body A can be secured safely to the seat S by engaging the seat belt B with the main leg bar 4. Particularly, the construction according to the invention in which the top ends of the securing belts 207 are, after passing through the back rest portion 2, wound around the main leg bar 4 to be united together ensures that the baby's body is held securely by the seat belt B and secured directly to the main leg bar 4. Thus, the safety may be greatly enhanced compared with the conventional chairs in which the belts 207 are indirectly united with the seat S by securing them only to the back portion. In addition, since the ends of the securing belts 207 are wound around the main leg bar 4 to be united together, the external forces exerting on the securing belts 207 when the baby's body is sprung out in case of collision, etc. will be applied to the main leg bar and absorbed by it without concentrating in a position on the back portion 2, which would prevent said portion form break-down.

What is claimed is:

1. A baby chair comprising: a chair body including a seat portion and a back rest portion; main support leg means for supporting said chair body, said main support leg means including an integrally formed U-shaped main support leg member pivotally coupled directly to said seat portion of said chair body; means for supporting said main support member in a lateral position at which said main support leg member is located substantially below an underside surface of said seat portion; and means for holding said support member in a rising position at which said main support leg member is located substantially behind said back rest portion.

2. The baby chair of claim 1 further including an auxiliary leg pivotably connected to a rear end portion of said seat portion and means for adjusting an angle of said auxiliary leg with respect to a horizontal plane.

3. The baby chair of claim 1 in which said means for supporting includes a support member at one side pivotally connected to said main support by member and on the other side detachably coupled to a rear end portion of said seat portion.

4. The baby chair of claim 1, in which said holding means includes a first holder unit engageable with said main support leg member.

5. The baby chair of claim 1 further comprising a front leg pivotally coupled to a front portion of said seat portion, said front leg being collapsible inwardly.

6. The baby chair of claim 1 further including a clamping mechanism provided at an intermediate portion and on an upper surface of said main support leg member.

7. The baby chair of claim 6, in which said clamping mechanism includes a base frame fixed to said main support leg member having at one end an engagement finger, an intermediate clamping lever pivotally coupled at one end to the other end of said base frame, and a main clamping lever pivotally coupled at one end to the other end of said intermediate clamping lever, said main clamping lever being provided with an engagement member engageable with said engagement finger, wherein an automotive seat belt may be firmly clamped between said base frame and said intermediate clamping lever.

8. The baby chair of claim 4, in which said first holder unit includes a pin fixed to said main support leg member and engageable with associated retaining means provided at a lower portion of said seat portion.

9. The baby chair of claim 8, in which said associated retaining means is provided with a locking mechanism.

10. The baby chair of claim 4, in which said holding means further includes a second holder unit rotatably fixed to an upper portion of said back rest portion and engageable with said main support leg member.

11. The baby chair of claim 2, wherein said auxiliary leg is biased toward the rear end portion of said seat portion and is provided with an engagement pin which is selectively engageable grooves formed in a support member fixed to said seat portion.

12. The baby chair of claim 1, in which said main support leg further includes a rotatable rear leg.

13. The baby chair of claim 6, further includes belt means having a belt member which passes through a corresponding hole formed in the back rest portion and is firmly coupled to said main support leg member.

* * * * *